Nov. 27, 1951 — H. E. POUELL — 2,576,724
AUTOMOBILE WHEEL-BALANCE WEIGHT
Filed June 26, 1947

H. E. Powell
INVENTOR
BY *Snow & Co.*
ATTORNEYS.

Patented Nov. 27, 1951

2,576,724

UNITED STATES PATENT OFFICE 2,576,724

AUTOMOBILE WHEEL-BALANCE WEIGHT

Harry E. Pouell, Kokomo, Ind.

Application June 26, 1947, Serial No. 757,218

1 Claim. (Cl. 301—5)

This invention relates to automobile wheel-balance weight construction, the primary object of the invention being to provide a weight of this character which is adapted for use on various types of wheels of varying radii.

An important object of the invention is to provide an attaching means for automobile wheel-balance weights wherein a three-point contact will be provided between the spring clip and weight proper and rim on which the weight is secured, thereby insuring against accidental displacement of the weight.

Another important object of the invention is to provide a weight which is so constructed that it will lie within the confines of the outer edge of the rim to the end that there will be no protruding parts that could contact with the steering knuckles or the like mechanism under a car, when the weight is used on the inner rim surfaces of a wheel.

With the foregoing and other objects in view which will appear as the description proceeds, the invention consists of certain novel details of construction and combinations of parts, hereinafter more fully described and pointed out in the claim, it being understood that changes may be made in the construction and arrangement of parts without departing from the spirit of the invention as claimed.

Referring to the drawing

Figure 1:
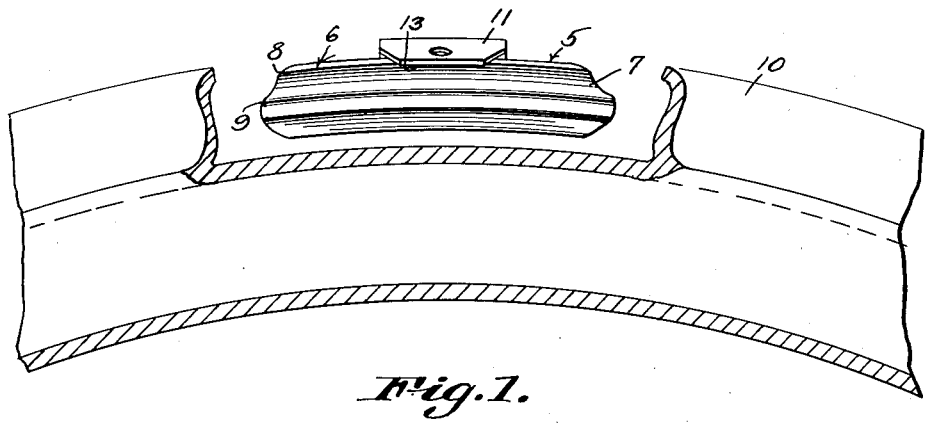
Figure 1 is an elevational view illustrating an automobile wheel-balance weight, constructed in accordance with the invention.
Figure 2:
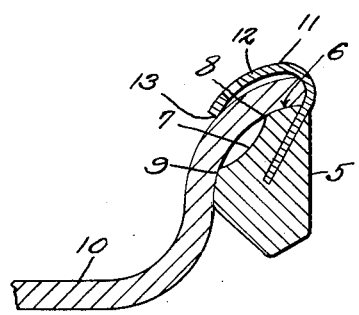
Figure 2 is a sectional view taken transversely through the center of the weight.

Referring to the drawing in detail, the body portion or weight is indicated by the reference character 5 and is constructed to provide a curved surface 6 designed to fit the type of rim having a one-quarter inch flange radius, as clearly shown by Figure 2 of the drawing.

The curved surface is formed with a groove 7 disposed throughout its length providing contact points 8 and 9 for engagement with the outer surface of the rim of the wheel on which the device is positioned, the rim being indicated by the reference character 10.

It will also be seen that the curvature of the clip and weight will also permit the weight to be secured to the type of rim having a three inch radius, thereby providing a wheel weight for universal use.

The reference character 11 indicates the spring clip which has one of its edges embedded in the body portion 5 at such an angle that when the curved portion 12 of the clip is positioned over the inner surface of the rim 10 as shown by Figure 2 of the drawing, the contact between the clip and rim 10 will be at the free edge of the clip, or at the point indicated by the reference character 13.

It might be further stated that the weight and clip are so constructed that when the weight has been properly positioned over the edge of an automobile wheel rim, the outer surface of the weight will lie within the confines of the edge of the rim, so that no portion of the weight protrudes beyond the edge of the rim, to contact with steering knuckles or other elements supported under a vehicle, and which would result in the weights becoming displaced.

What is claimed is:

In a wheel rim and wheel balancing weight combination an elongated body portion curved longitudinally in the arc of a circle corresponding to the curvature of the rim, the body portion having an inner surface positioned against the wheel rim, the inner surface of the body portion having a longitudinal groove extending throughout the entire length thereof defining spaced upper and lower rim contacting edges, a spring clip connected with the body portion curved around the edge of the rim, and the free edge of the clip contacting the rim at a point directly opposite to the center of the longitudinal groove.

HARRY E. POUELL.

REFERENCES CITED

The following references are of record in the file of this patent:

UNITED STATES PATENTS

| Number | Name | Date |
|---|---|---|
| 734,417 | Hubbell | July 21, 1903 |
| 1,063,500 | Bosworth | June 3, 1913 |
| 1,493,442 | Swain | May 6, 1924 |
| 2,036,757 | Hume | Apr. 7, 1936 |
| 2,122,065 | Hume | June 28, 1938 |
| 2,221,747 | Turner | Nov. 19, 1940 |